United States Patent
Lee et al.

(10) Patent No.: US 10,590,038 B1
(45) Date of Patent: Mar. 17, 2020

(54) PRODUCING CEMENTITIOUS MATERIALS WITH IMPROVED HYDROPHOBICITY AND STRENGTH USING RECLAIMED WASTE SUBSTANCES

(71) Applicants: Maw-Tien Lee, Taipei (TW); Zih-Yao Shen, Taipei (TW); Chi-Yao Chen, Taipei (TW); Fu-Ming Lee, Katy, TX (US); John Lee, Taipei (TW)

(72) Inventors: Maw-Tien Lee, Taipei (TW); Zih-Yao Shen, Taipei (TW); Chi-Yao Chen, Taipei (TW); Fu-Ming Lee, Katy, TX (US); John Lee, Taipei (TW)

( * ) Notice: Subject to any disclaimer, the term of this patent is extended or adjusted under 35 U.S.C. 154(b) by 0 days.

(21) Appl. No.: 16/458,771

(22) Filed: Jul. 1, 2019

(51) Int. Cl.
| | |
|---|---|
| *C04B 40/00* | (2006.01) |
| *C04B 14/02* | (2006.01) |
| *C04B 18/04* | (2006.01) |
| *C04B 18/14* | (2006.01) |
| *C04B 18/22* | (2006.01) |
| *C04B 7/00* | (2006.01) |
| *C04B 7/34* | (2006.01) |

(Continued)

(52) U.S. Cl.
CPC .......... *C04B 14/022* (2013.01); *C04B 18/049* (2013.01); *C04B 18/146* (2013.01); *C04B 18/22* (2013.01); *C04B 2103/0052* (2013.01); *C04B 2103/406* (2013.01); *C04B 2111/27* (2013.01); *C04B 2201/50* (2013.01)

(58) Field of Classification Search
USPC ................................................. 106/638, 819
See application file for complete search history.

(56) References Cited

U.S. PATENT DOCUMENTS

| | | | |
|---|---|---|---|
| 3,885,985 A | 5/1975 | Serafin | |
| 4,125,504 A | * 11/1978 | Mani | ....................... C04B 28/02 |
| | | | 524/269 |

(Continued)

FOREIGN PATENT DOCUMENTS

| | | |
|---|---|---|
| WO | 9928264 A1 | 6/1999 |
| WO | 0230846 A1 | 4/2002 |

OTHER PUBLICATIONS

Peng Liu et al., Hydrophobic and water-resisting behavior of Portland cement incorporated by oleic acid modified fly ash, Materials and Structures (Feb. 22, 2018) 51:38.

*Primary Examiner* — James E McDonough
(74) *Attorney, Agent, or Firm* — Charles H. Jeur

(57) ABSTRACT

A hydrophobic admixture, for cementitious materials such as cement paste, mortar, and concrete, includes solid polymer particles with a coating of hydrophobic agent and surfactant. The solid polymer particles adhere to exterior surfaces of hydrated cement particles in the cement matrix. The solid polymer particles deliver the hydrophobic agent into the cement matrix which is hydrophilic. The hydrophobic agents are distributed uniformly throughout the cement matrix. The solid polymer particles can be crumb rubber particles derived from waste rubber tires, recycled plastics and similar solid materials. The hydrophobic liquid agent is derived from waste lubricant oil, spent motor oil, base oil, esters of fatty acids, vegetable oil and the like. Fine particles such as activated carbon, silica fume and spent catalyst can be employed to fill the large pores or cracks that develop in the cementitious matrix. The cured cementitious materials exhibit high contact angles and high compressive strengths.

27 Claims, 9 Drawing Sheets

(51) Int. Cl.
*C04B 28/00* (2006.01)
*C04B 32/00* (2006.01)
*C04B 103/00* (2006.01)
*C04B 103/40* (2006.01)
*C04B 111/27* (2006.01)

(56) References Cited

U.S. PATENT DOCUMENTS

| | | |
|---|---|---|
| 4,892,729 A | 1/1990 | Cavazza |
| 5,736,600 A | 4/1998 | Karkare |
| 5,810,921 A | 9/1998 | Baxter |
| 6,267,985 B1 | 7/2001 | Chen |
| 6,761,765 B2 | 7/2004 | Lu |
| 6,797,052 B1 | 9/2004 | Chowdhury |
| 7,314,624 B2 | 1/2008 | Baker |
| 7,846,251 B2 | 12/2010 | Aldykiewicz |
| 7,893,014 B2 | 2/2011 | van Buskirk |
| 8,338,506 B2 | 12/2012 | Yen |
| 8,536,239 B1 | 9/2013 | Yen |
| 8,536,253 B2 | 9/2013 | Yen |
| 8,603,241 B2 | 12/2013 | Aldykiewicz |
| 9,056,987 B2 | 6/2015 | Sunder |
| 10,131,575 B2 | 11/2018 | Guyun |
| 2011/0112225 A1* | 5/2011 | Sudhakar ............... C08L 95/005 524/64 |
| 2012/0045954 A1* | 2/2012 | Bleecher ................. C09K 3/18 442/80 |
| 2016/0185665 A1 | 6/2016 | Al-Aqeeli |

* cited by examiner

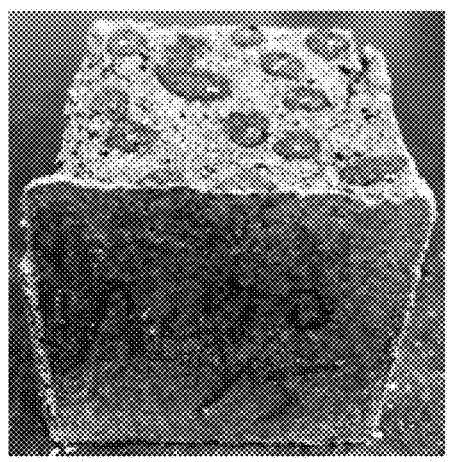
FIG. 12
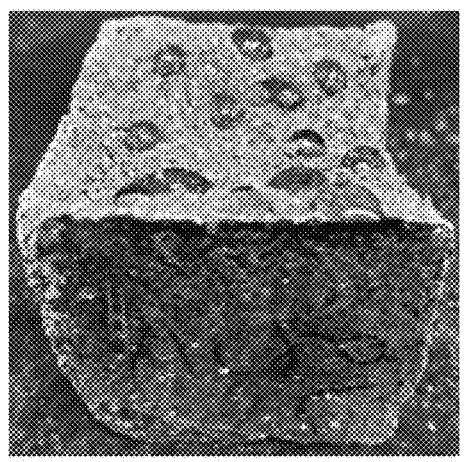
FIG. 13
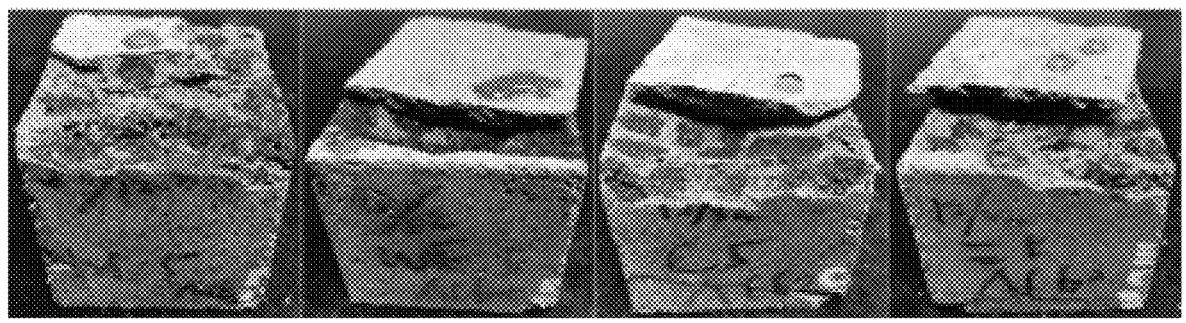
FIG. 14A
(Spent lubricant oil)
FIG. 14B
(Used motor oil)
FIG. 14C
(Castor oil)
FIG. 14D
(Caprylic/capric triglyceride)
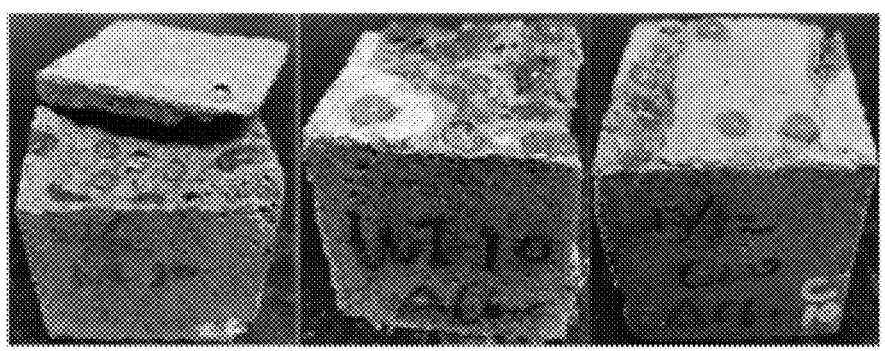
FIG. 15A
(Spent lubricant oil)
FIG. 15B
(Used motor oil)
FIG. 15C
(Castor oil)

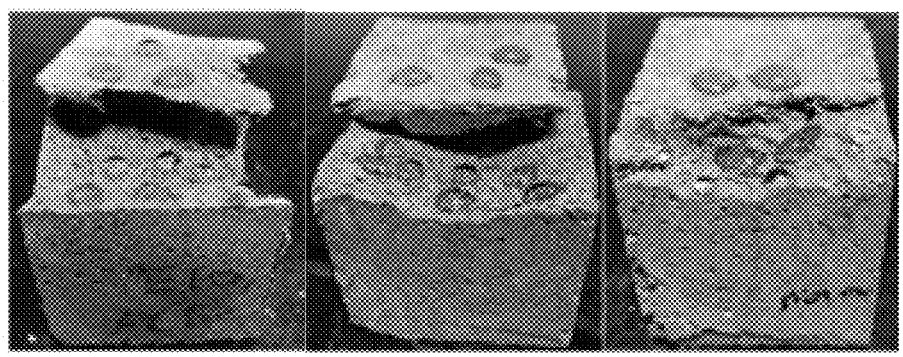
FIG. 15D
(Caprylic/capric triglyceride)
FIG. 15E
(Silicone oil 350)
FIG. 15F
(Silicone oil 1000)
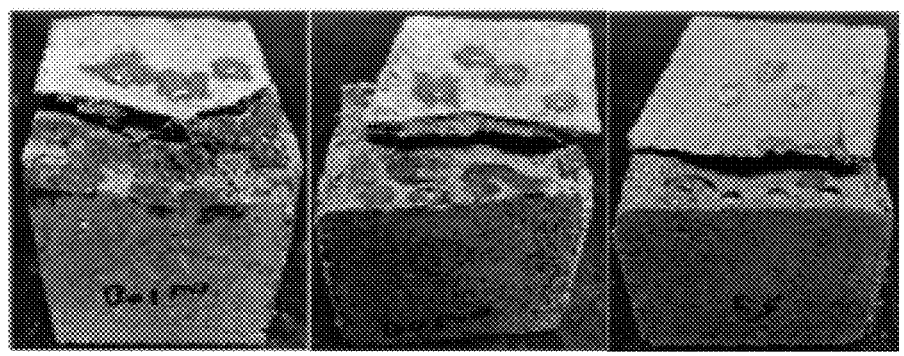
FIG. 15G
(Base oil 150)
FIG. 15H
(Base oil 500)
FIG. 15I
(n-butyl stearate)
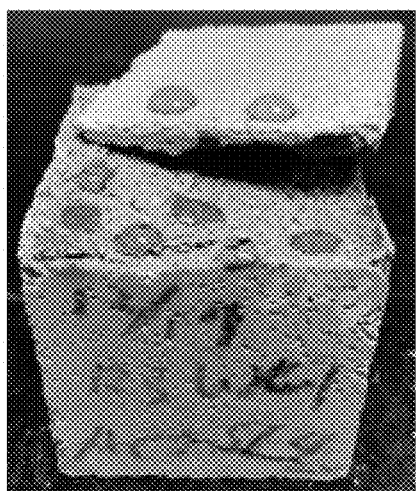
FIG. 16
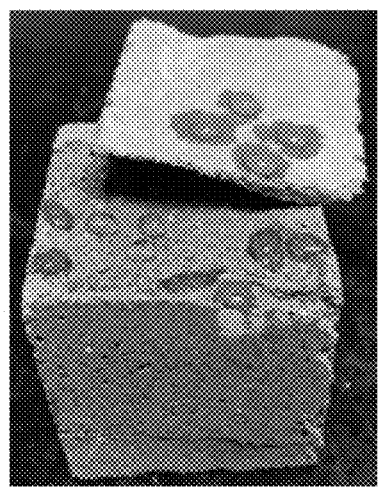
FIG. 17

PRODUCING CEMENTITIOUS MATERIALS WITH IMPROVED HYDROPHOBICITY AND STRENGTH USING RECLAIMED WASTE SUBSTANCES

FIELD OF THE INVENTION

The present invention relates to hydrophobic admixtures for cementitious materials and more particularly to admixtures, which are formed from (i) crumb rubber which is derived from waste rubber tires and plastics, (ii) waste lubricant oil and the like, (iii) surfactant, and (iv) fine particles, that impart water repellant properties without compromising the cementitious materials' mechanical strength.

BACKGROUND OF THE INVENTION

A cementitious mixture refers to pastes, mortars, and concrete compositions comprising a hydraulic cement binder having consistencies ranging from stiff to extremely dry. Pastes are defined as mixtures composed of a hydraulic cement binder, either alone or in combination with pozzolans such as fly ash, silica fume, or blast furnace slag, and water. Mortars are defined as pastes that additionally include fine aggregate. Concretes additionally include coarse aggregate. These compositions may additionally include other admixtures such as set retarders, set accelerators, defoaming agents, air-entraining or air detraining agents, corrosion inhibitors, water reducing agents, and pigments.

Water repellant components have also been incorporated into conventional cement mixtures but the hydrophobic cementitious mixtures that are produced tend to exhibit reduced mechanical strengths. In addition, most hydrophobic agents are lipophilic organic solvents whereas the cement matrix is hydrophilic. The hydrophobic agents are insoluble in the water phase, causing inhomogeneous dispersion of the hydrophobic agent in aqueous cementitious mixtures. Industry is in need of developing improved hydrophobic cementitious mixtures using low-cost additives particularly from reclaimed waste materials.

SUMMARY OF THE INVENTION

The present invention is based in part on the development of an admixture comprising of (i) crumb rubber particles which are preferably derived from waste rubber tires, recycled plastics and similar solid materials and (ii) a hydrophobic liquid agent that is preferably derived from waste lubricant oil, spent motor oil, base oil, esters of fatty acids, vegetable oil and the like. The crumb rubber particles serve as solid polymer carriers for the hydrophobic agent. The admixture is incorporated into cementitious mixtures or materials to enhance their hydrophobicity without reducing their strengths. A surfactant can be blended into the hydrophobic agent to form a modified hydrophobic agent. The surfactant improves the surface property of the carrier particles. The hydrophobic admixture can also include fine particles, which are non-polymeric (non-rubber and non-plastic) solid particles, such as, for instance, activated carbon, silica fume, and spent catalyst. The fine particles fill the large pores or cracks that develop in the cementitious matrix to increase the mechanical strength of the cementitious material. The cured or set cementitious materials that are formed, including cement paste, mortar, and concrete, exhibit high contact angles and high compressive strengths.

In one aspect, the invention is directed to an admixture composition, for improving the hydrophobicity of a cementitious material that includes a cement mixture with hydrated cement particles dispersed therein, which comprises solid polymer particles that have a surface coating comprising a hydrophobic agent, wherein the solid polymer particles adhere to exterior surfaces of the hydrated cement particles, and at least one of (i) a surfactant that is blended with the hydrophobic agent or (ii) fine particles.

In another aspect, the invention is directed to a set cementitious composition which includes a cement mixture with hydrated cement particles dispersed therein and which comprises solid polymer particles that have a surface coating comprising a hydrophobic agent, wherein the solid polymer particles adhere to exterior surfaces of the hydrated cement particles, and at least one of (i) a surfactant that is blended with the hydrophobic agent or (ii) fine particles.

In yet another aspect, the invention is directed to a method of preparing a cementitious composition which includes (a) forming a cement mixture by mixing dry cement, water, and a hydrophobic admixture which comprises solid polymer particles that have a surface coating comprising a hydrophobic agent whereby the solid polymer particles adhere to exterior surfaces of hydrated cement particles that develop in the cement mixture, and at least one of (i) a surfactant that is blended with the hydrophobic agent or (ii) fine particles; and (b) curing the cement mixture to form a set cementitious composition.

BRIEF DESCRIPTION OF THE DRAWINGS

FIG. 12 is a photographic view of a mortar specimen incorporating a hydrophobic admixture of 15 wt % crumb rubber particles, 15 wt % lubricant oil and SPAN 20 blend, and 70 wt % activated carbon, wherein the surfactant to lubricant oil weight ratio is 3:7;

FIG. 13 is a photographic view of a mortar specimen incorporating a hydrophobic admixture of 5 wt % crumb rubber particles, 15 wt % lubricant oil and SPAN 20 blend, and 80 wt % activated carbon, wherein the surfactant to lubricant oil weight ratio is 3:7;

FIGS. 14A, 14B, 14C, and 14D are photographic views of mortar specimens incorporating a hydrophobic admixture of 35 wt % crumb rubber particles, 5 wt % oil and SPAN 20 blend, and 60 wt % activated carbon, wherein the surfactant to lubricant oil weight ratio is 3:7 and the oil consisted of spent lubrication oil, used motor oil, castor oil, and caprylic/capric triglyceride, respectively;

FIGS. 15A, 15B, 15C, 15D, 15E, 15F, 15G, 15H, and 15I are photographic views of mortar specimens incorporating a hydrophobic admixture of 30 wt % crumb rubber particles, 10 wt % oil and SPAN 20 blend, and 60 wt % activated carbon, wherein the surfactant to oil weight ratio is 3:7 and the oil consisted of spent lubrication oil, used motor oil, castor oil, caprylic/capric triglyceride, silicone oil 350, silicone oil 1000, basil oil 150, base oil 500, and n-butyl stearate, respectively;

FIG. 16 is a photographic view of the surface and interior of a mortar specimen incorporating a hydrophobic admixture of 30 wt % crumb rubber particles, 10 wt % lubricant oil and SPAN 20 blend, 20 wt % activated carbon, and 40 wt % silica fume, wherein the surfactant to lubricant oil weight ratio is 3:7;

FIG. 17 is a photographic view of the surface and interior of a mortar specimen incorporating a hydrophobic admixture of 30 wt % crumb rubber particles, 10 wt % lubricant oil and SPAN 20 blend, 20 wt % activated carbon, and 40 wt % spent RFCC catalyst, wherein the surfactant to lubricant oil weight ratio is 3:7;

DESCRIPTION OF THE PREFERRED EMBODIMENTS

Figure 1A:
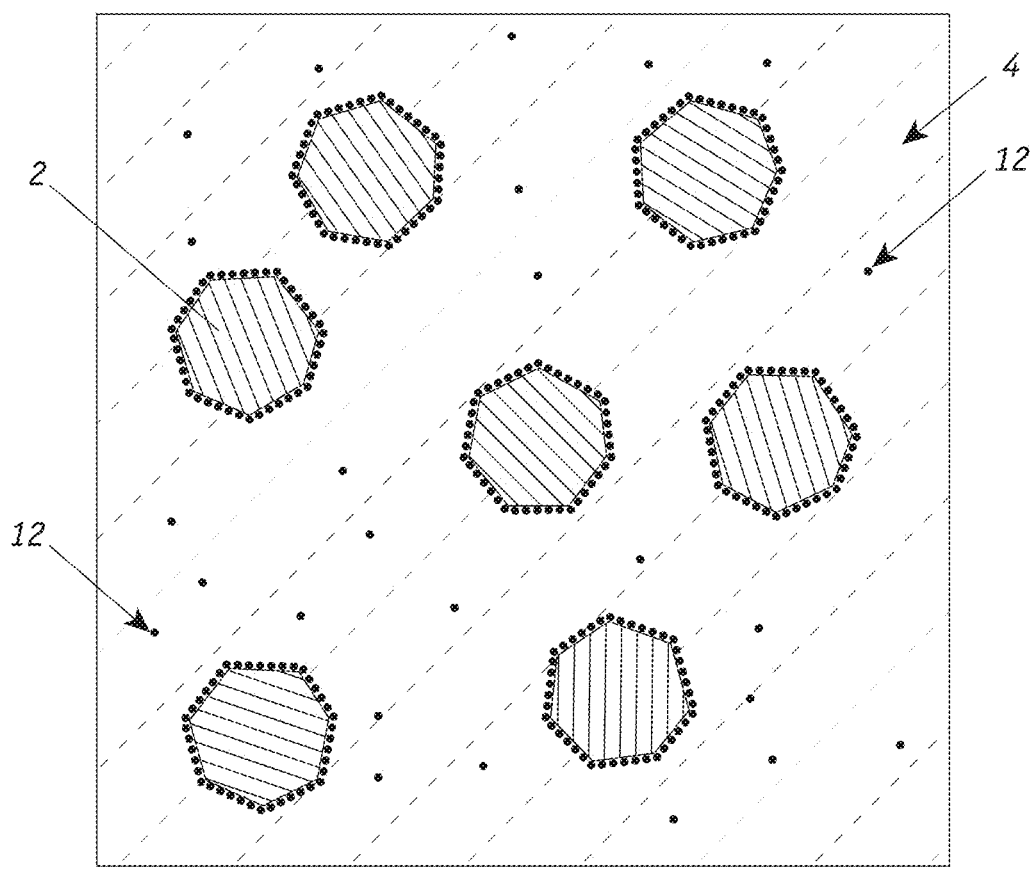
FIGS. 1A, 1B, 1C and 1D are schematics that depict treated hydrophobic carriers homogeneously distributed in an aqueous cementitious mixture.

The present invention provides hydrophobic admixtures that impart hydrophobic properties to cementitious materials without adversely affecting the strengths of the cementitious materials. The hydrophobic admixture includes solid polymer particles that have a surface coating comprising a hydrophobic agent. Preferred embodiments of the admixture also include a surfactant that is blended into the hydrophobic agent and fine particles that are distributed in the admixture.

The solid polymer particles are preferably crumb rubber particles that are derived from used or waste tires, recycled plastics, and other sources of polymeric waste materials. Where the source is waste tires, the crumb rubber is recycled tires in a process that initially separates the rubber component from the steel wires, glass fibers, and other non-rubber materials; subsequently, debris-free rubber is recovered by cryogenic freezing with liquid nitrogen or other suitable means. The rubber then is mechanically grounded and screened into irregular-shaped particles of the desired size that typically ranges from 100-1000 µm and preferably from 300-600 µm. The crumb rubber comprises natural rubber, styrene-butadiene rubber, butadiene rubber, butyl rubber, and/or isoprene rubber. These polymers are typically cross-linked by organic sulfur compounds that improve the durability and strength of cured rubber. The solid polymer particles serve as carrier particles for the hydrophobic agent and typically comprise 10 to 40% and preferably 15 to 30% by weight of the hydrophobic admixture.

The fine particles refer to non-polymeric materials with diameters that typically range from 1 to 1000 µm and preferably from 1 to 500 µm. The non-polymeric materials can be reclaimed from the waste materials. Preferred fine particles includes, for example, activated carbon, silica fume which is reclaimed from thermal cracking unit or incinerator bottoms, and spent catalyst which is reclaimed from an FCC (fluid catalytic cracking) unit in a refinery. The fine particles are particularly suited for filling the large pores or cracks in the cement matrix to increase the mechanical strength of the hydrophobic cementitious material. Some fine particles have polar functional groups on their surfaces that bond to the cement matrix. When fine particles are used, these particles typically comprise 1 to 80% and preferably 40 to 60% by weight of the hydrophobic admixture. The weight ratio of the solid polymer particles to fine particles typically ranges from 2:1 to 1:2. In a preferred embodiment, the weight ratio of (i) the combination of solid polymer particles and the fine particles to (ii) the hydrophobic agent ranges from 10:1 to 10:3.

The hydrophobic agent refers to a material, which is liquid at ambient temperatures (20° C.), and that does not adsorb or absorb water and which forms a coating on treated solid polymer particles. Preferred hydrophobic agents are hydrocarbon hydrophobic agents that include, for example, waste lubricant oil, spent motor oil, base oil, ester of fatty acids, and vegetable oil. The hydrophobic agent typically comprises 0.1 to 15% and preferably 1 to 10% by weight of the hydrophobic admixture.

The surfactant refers to any molecule having both a polar hydrophilic head group, which energetically prefers solvation by water, and a hydrophobic tail that is not well solvated by water. The surfactant reduces surface tension when dissolved in water or water solutions, or reduces interfacial tension between two liquids, or between a liquid and a solid. A cationic surfactant has a cationic head group, an anionic surfactant has an anionic, and an amphoteric surfactant simultaneously carries both the anionic and cationic head groups. The surfactant is preferably incorporated into the hydrophobic agent to form a viscous modified hydrophobic agent before being mixed with the solid polymer particles. Preferred surfactants have an HLB value of 1.0 to 15.0 and preferably 5.0 to 10.0. When a surfactant is used, the surfactant typically comprises 1 to 20% and preferably 1 to 15% of the hydrophobic admixture. The surfactant is preferably blended with the hydrophobic agent and weight ratio of surfactant to hydrophobic agent in the blend typically ranges from 0.1 to 0.7 and preferably 0.1 to 0.5.

To avoid the influence of ions on cement hydration, non-ionic surfactants are preferred. SPAN and TWEEN series surfactants are commercially available non-ionic surfactants which have advantages over ionic surfactants, such as increased stability, formulating flexibility and wider compatibility. TWEEN surfactants are polyethoxylated sorbitan esters and SPAN surfactants are sorbitan esters. They are stable in mild acids, alkalis and electrolytes and over a wide pH range. In particular, the non-ionic surfactants are preferably selected from TWEEN series (20-21-40-60-61-65-80) and SPAN series (20-40-60-80-83-85-120) which are further described in Table 1.

TABLE 1

Chemical Identities and Hydrophile Lipophile Balance of SPAN and TWEEN Surfactants

| Product | Identity | HLB value | Product | Identity | HLB value |
|---|---|---|---|---|---|
| SPAN 20 | Sorbitan monolaurate | 8.6 | TWEEN 20 | PEG-20 sorbitan monolaurate | 16.7 |
| SPAN 40 | Sorbitan monopalmitate | 6.7 | TWEEN 21 | PEG-4 sorbitan monolaurate | 13.3 |
| SPAN 60 | Sorbitan monostearate | 4.7 | TWEEN 40 | PEG-20 sorbitan monopalmitate | 15.6 |
| SPAN 80 | Sorbitan monooleate | 4.3 | TWEEN 60 | PEG-20 sorbitan monostearate | 14.9 |
| SPAN 83 | Sorbitan sesquioleate | 3.7 | TWEEN 61 | PEG-4 sorbitan monostearate | 9.6 |
| SPAN 85 | Sorbitan trioleate | 1.8 | TWEEN 65 | PEG-20 sorbitan tristearate | 10.5 |
| SPAN 120 | Sorbitan isostearate | 4.7 | TWEEN 80 | PEG-20 sorbitan monoolate | 15.0 |

The SPAN products listed in Table 1 are partly soluble in water at 10% w/w at 25° C. TWEEN 20 and 60 are also partly soluble, whereas TWEEN 40 and 60 are soluble and TWEEN 65 forms a gel in water. Due to the lower HLB values, SPAN surfactants have better solubilities in an oil phase than the TWEEN surfactants. SPAN surfactants were selected for further testing and mixed with the hydrophobic agent to coat the polymer particles.

Contact angle is the angle between a static drop of water and a flat and horizontal surface upon which the droplet is placed. The contact angle is conventionally measured through the liquid, where a liquid/vapor interface meets a solid surface, and quantifies the wettability of a solid surface by a liquid. The higher the contact angle, the higher the hydrophobic interaction between the surface and the liquid. If the liquid spreads completely on the surface and forms a film, the contact angle is zero degrees. As the contact angle increases, the wetting resistance increases, up to a theoretical maximum of 180°, where the liquid forms spherical drops on the surface. "Hydrophobic" is a term used to describe a wetting resistant surface where the reference liquid is water. The higher the contact angle, the higher the hydrophobic interaction between the surface and the liquid. With the present invention, incorporation of the hydrophobic admixture into a cementitious material renders the cured or set cementitious material hydrophobic so that the its surface can generate a contact angle of greater than 90° with water as the reference liquid. Preferred set cementitious materials will have contact angles of at least 45 degrees and more preferably greater than 90 degrees.

A method of preparing the hydrophobic admixture is to first incorporate the hydrophobic agent such as waste lubricant oil with a surfactant by mixing the components together to yield a modified hydrophobic agent that has the consistency of a viscous liquid wherein the surfactant is dispersed within the hydrophobic agent. The modified hydrophobic agent is then mixed with the solid polymer particles such as crumb rubber. If fine particles such as activated carbon are used, they are blended into the mixture to form a hydrophobic admixture that is ready for use.

Figure 1B:
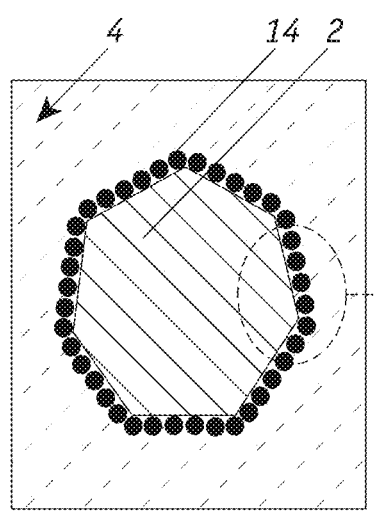

The hydrophobic admixture of the present invention is mixed with cementitious materials such as hydraulic cement binder and water to form a cement mixture. Pozzolans, fine aggregates and coarse aggregates can be added as necessary. The weight ratio of the hydrophobic admixture to cementitious materials (including cement and aggregates) is typically from 1:1 to 1:100 and preferably from 1:1 to 1:10. As illustrated in FIGS. 1A and 1B, as the cement mixture cures, hydrated cement (2) consisting of cement particles and water forms throughout the cement solution or matrix (4). Each hydrated cement (2) is surrounded by treated solid polymer particles (14). Some isolated solid polymer particles 12 are distributed within the cement matrix (4). Fine particles are not shown.

Figure 1C:
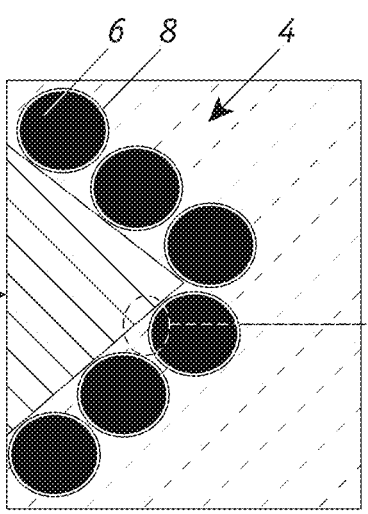
Figure 1D:
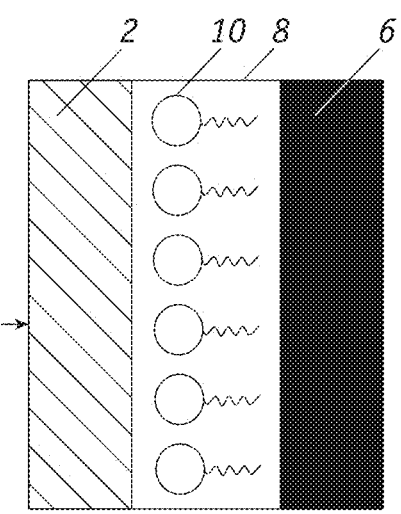

As shown in FIGS. 1C and 1D, the treated solid polymer particle comprises a solid polymer particle (6) with a layer (8) of modified hydrophobic agent that is coated on the exterior surface of the particle (6). The alignment of the surfactants (10) within the layer (8) further improves the exterior surface properties of the solid polymer particle (6) so that the hydrophobic solid particles, as the carrier along with the carried hydrophobic agent, form a thin continuous oil phase around each hydrated cement (2). Hydration of the cement paste proceeds without interference of the modified hydrophobic agent in the continuous oil phase. Upon completion of the hydration, the thin continuous oil phase provides excellent hydrophobic property and mechanical strength for the cementitious materials. When set or cured, the cementitious material has a compressive strength of 15 to 50 MPa and preferably of 25 to 40 MPa.

Cement Paste Samples

Cement pastes containing different hydrophobic admixtures were initially evaluated for hydrophobic properties.

Various hydrophobic admixtures comprising different amounts of (i) crumb rubber, (ii) waste lubricant oil (hydrophobic agent), (iii) SPAN 20 (HLB=8.6) and SPAN 80 (HLB=4.3) (non-ionic surfactant) and (iv) activated carbon were incorporated into cement pastes to assessment hydrophobic characteristics. The crumb rubber was made from rubber tires and were 300 to 600 μm in size. In particular, various surfactant/hydrophobic agent blends (SHB) were prepared by mixing the non-ionic surfactant and waste lubricant oil in the weight ratios of 0:10, 1:9 and 3:7. Various crumb rubber and activated carbon (RAC) combinations were tested wherein the crumb rubber particles and activated carbon particles were in the weight ratios of 10:0, 8:2, 6:4, 4:6, 2:8 and 0:10. Selected hydrophobic admixtures had different weight proportions of SHB to RAC combinations which ranged from ratios 10:0, 10:1, 10:2, . . . , 10:9, and 0:10) to obtain the hydrophobic admixture. In practice, each hydrophobic admixture was prepared by first thoroughly blending the crumb rubber with the SHB and then subsequently adding the activated carbon, if any.

In the preparing individual cement paste samples, cement powder and the hydrophobic admixture were mixed in a weight ratio of 10:1. The water to cement weight ratio was 0.45. The cement paste samples were poured into petri dishes and allowed to cured for 28 days at ambient temperature of about 20° C. Water droplets were deposited on the surface of the samples and the contact angles were evaluated visually.

In general, it was observed that hydrophobic admixtures that contained neither the surfactant nor activated carbon conferred minimal hydrophobicity improvements to the cement paste samples. That is, modified rubber particles with adsorbed waste lubricant oil alone provided minor improvements in water repellency. However, modified rubber particles with the surfactant/hydrophobic agent blend (waste lubricant oil and non-ionic surfactant) did enhance water repellency significantly. In addition, modified rubber particles with the hydrophobic agent and activated carbon also improved water repellency. Representative cured cement samples with water droplets deposited thereon are shown in FIGS. 2 to 6.

Figure 2A:
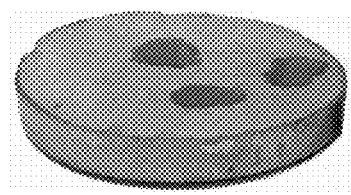
FIGS. 2A, 2B, and 2C are photographic views of cement paste samples with hydrophobic admixtures of rubber particles, lubricant oil (without any surfactant), and activated carbon.
Figure 2B:
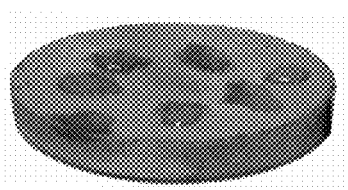
Figure 2C:
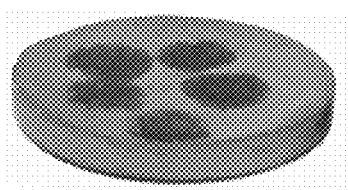

FIGS. 2A, 2B, and 2C are cured cement paste samples made from cement powder, crumb rubber, lubricant oil, and activated carbon but with no surfactant. Each sample was 6 cm in diameter. In particular, the hydrophobic admixture included 30 wt % crumb rubber while the combined amount of crumb rubber and activated carbon (if any) comprised 85-90 wt % of the hydrophobic mixture. The weight ratio of activated carbon to crumb rubber was varied. The weight ratio of crumb rubber to activated carbon of the samples was 10:0 (FIG. 2A), 6:4 (FIG. 2B) and 4:6 (FIG. 2C) respectively. The images show a modest increase in the contact angle with increasing activated carbon levels. Thus, even without the surfactant, use of activated carbon improved water repellency.

Figure 3A:
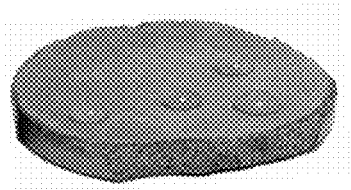
FIGS. 3A, 3B, and 3C are photographic views of cement paste samples with hydrophobic admixtures of rubber particles, lubricant oil, SPAN 20, and activated carbon.
Figure 3B:
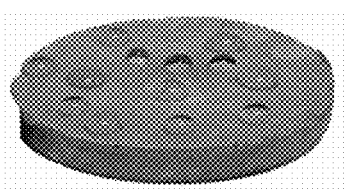
Figure 3C:
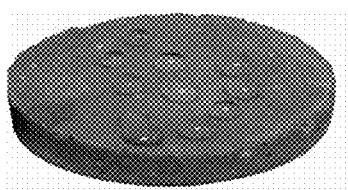

FIGS. 3A, 3B, and 3C are cured cement paste samples made from cement powder, crumb rubber, lubricant oil, activated carbon, and SPAN 20. In particular, the hydrophobic admixture included 30 wt % crumb rubber, 10 wt % spent lubricant oil and SPAN 20 blend, wherein the weight ratio of surfactant to spent lubricant oil in the blend was 3:7. The combined amount of crumb rubber and activated carbon (if any) comprised 85-90 wt % of the hydrophobic mixture. The weight ratio of activated carbon to crumb rubber was varied. The weight ratio of crumb rubber to activated carbon of the samples is 10:0 (FIG. 3A), 6:4 (FIG. 3B) and 4:6 (FIG. 3C), respectively. The images show an increase in the contact angle with increasing activated carbon levels.

Figure 4A:
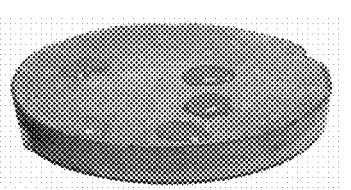
FIGS. 4A, 4B, and 4C are photographic views of cement paste samples with hydrophobic admixtures of rubber particles, lubricant oil, SPAN 80, and activated carbon.
Figure 4B:
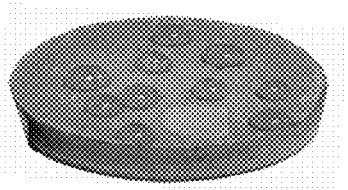
Figure 4C:
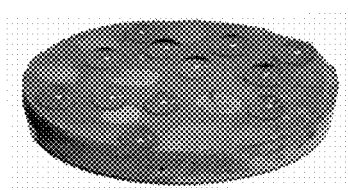

FIGS. 4A, 4B, and 4C are cured cement paste samples made from cement powder, crumb rubber, lubricant oil, activated carbon, and SPAN 80. In particular, the hydrophobic admixture included 30 wt % crumb rubber, 10 wt % spent lubricant oil and SPAN 80 blend, wherein the weight ratio of surfactant to spent lubricant oil in the blend was 3:7. The combined amount of crumb rubber and activated carbon (if any) comprised 85-90 wt % of the hydrophobic mixture. The weight ratio of activated carbon to crumb rubber was varied. The weight ratio of crumb rubber to activated carbon of the samples is 10:0 (FIG. 4A), 6:4 (FIG. 4B) and 4:6 (FIG. 4C), respectively. The images show an increase in the contact angle with increasing activated carbon levels.

Increasing the percentage of non-ionic surfactants or activated carbon in the hydrophobic admixture can improve the water repellency of the cement paste samples. The cement pastes containing SPAN 20 exhibited higher water repellency as compared to those with SPAN 80, which has lower HLB value. The higher lipophilic (oil-like) nature of SPAN 80 makes it less dispersible in aqueous cement matrices.

Mortar Samples

Cement mortar specimens incorporating different hydrophobic admixtures were tested and compared to control cement mortar specimens made (i) with untreated crumb rubber as the admixture and (ii) without any admixture. The mixing weight ratio for the control mortar specimens without any admixture was: 1 cement:2.75 sand:0.6 water. For example, if the starting amount of hydraulic cement is 100 grams, then 275 grams of silica sand and 60 grams of water are needed.

For the test cement mortar specimens, 4.5 or 6 wt % of the silica sand was replaced by a hydrophobic admixture. In the case of 4.5 wt % replacement, for 100 grams of hydraulic cement, 262.625, 12.375, and 60 grams of silica sand, hydrophobic admixture and water, respectively, were used. The mortar specimens consisted of 5 cm square blocks.

The hydrophobic admixtures contained (i) crumb rubber, (ii) waste lubricant oil (hydrophobic agent), (iii) SPAN 20 (non-ionic surfactant), (iv) activated carbon, and, optionally (v) silica fume. The surfactant hydrophobic blend was prepared by mixing SPAN 20 and waste lubricant oil in a weight ratio of 3:7. The blend was mixed with the crumb rubber particles, fine powders to obtain the hydrophobic admixtures.

The mortar specimens were prepared by dry mixing the cement, sand and hydrophobic blend (if any) for 2 minutes and wet mixing with the water for 6 minutes and casting the mix into cubic molds (50×50×50 mm). After 24 hours, all the specimens were cured in saturated limewater at room temperature.

Specimens containing only untreated rubber particles, cement and sand were also prepared as controls.

Portland Type I cement used was produced by Taiwan Cement Corporation. (Taiwan) Its physical-chemical properties are set forth in Table 2. Refined sand used was from Ching-Ching Foundry Sand Co., Ltd. (Taiwan) The chemical composition and grain distribution of the sand are given in Table 3. Measurements of compressive strength were conducted according to ASTM C109.

TABLE 2

| Composition of Portland Type I Cement (Wt %) | |
|---|---|
| Composition | Content |
| $SiO_2$ | 20.42 |
| $Al_2O_3$ | 4.95 |
| $Fe_2O_3$ | 3.09 |
| CaO | 61.96 |
| $SO_3$ | 2.40 |
| MgO | 3.29 |
| Loss on ignition | 1.75 |
| Insoluble residue | 0.5 |
| $C_3S$ | 49 |
| $C_2S$ | 21 |
| $C_3A$ | 7.9 |
| $C_4AF$ | 9.4 |

TABLE 3

| Chemical composition and grain distribution of sand | | | | | | | | |
|---|---|---|---|---|---|---|---|---|
| Chemical composition (wt %) | | | Sieve size (μm) | | | | | |
| $SiO_2$ | $Al_2O_3$ | $Fe_2O_3$ | 841 | 595 | 420 | 297 | 210 | 149 |
| 97.5% | 2.06% | 0.07% | 2.2% | 29.3% | 55.6% | 12.3% | 0.5% | 0.1% |

EXAMPLE 1

In this example, control mortar specimens were prepared without any additives. Their compressive strengths were measured after 7, 14 and 28 day of being cured. Test mortar specimens were prepared where the hydrophobic admixture replacement levels for silica sand were 4.5 and 6 wt % and their compressive strengths were also measured. Table 4 sets forth the components of the different hydrophobic admixtures used. The hydrophobic oil used was spent lubricant oil. The amount of oil listed is a blend includes both the lubricant oil and SPAN 20 surfactant. The SPAN 20 to lubricant oil ratio of the blend is in a weight ratio of 3:7.

TABLE 4

| (1) Control mortar without additive Compressive Strength (MPa) | | |
|---|---|---|
| 7 days | 14 days | 28 days |
| 26.786 | 35.829 | 39.019 |

| (2) Admixture replacement levels for silica sand were 4.5 wt % | | | | | |
|---|---|---|---|---|---|
| Composition of Admixture (wt %) | | | Compressive Strength (MPa) | | |
| R | O | AC | 7 days | 14 days | 28 days |
| 100 | 0 | 0 | 11.806 | 13.551 | 15.412 |
| 90.91 | 9.09 | 0 | 12.305 | 15.583 | 16.992 |
| 66.67 | 16.67 | 16.67 | 13.167 | 14.92 | 17.191 |
| 46.15 | 23.08 | 30.77 | 13.151 | 14.993 | 17.934 |
| 28.57 | 28.57 | 42.86 | 17.042 | 19.998 | 22.234 |

| (3) Admixture replacement levels for silica sand were 6 wt % | | | | | |
|---|---|---|---|---|---|
| Composition of Admixture (wt %) | | | Compressive Strength (MPa) | | |
| R | O | AC | 7 days | 14 days | 28 days |
| 100 | 0 | 0 | 13.174 | 14.431 | 17.016 |
| 90.91 | 9.09 | 0 | 14.673 | 17.006 | 19.336 |
| 66.67 | 16.67 | 16.67 | 15.605 | 18.387 | 21.46 |
| 46.15 | 23.08 | 30.77 | 16.677 | 18.149 | 21.007 |
| 28.57 | 28.57 | 42.86 | 16.706 | 19.841 | 23.474 |

Note:
R - Crumb rubber particles
O - Spent lubricant oil
AC—Activated carbon

The mortar specimen containing untreated crumb rubber as the sole additive had lower compressive strengths than the control specimen. The presence of the hydrophobic admixture reduced the compressive strengths of the mortars relative to that of the control mortar without any additive. High levels of rubber and oil decreased the compressive strengths of the mortar specimens. The presence of activated carbon increased the compressive strengths.

EXAMPLE 2

In this example, test mortar specimens were prepared where the hydrophobic admixture replacement levels for silica sand was 4.5 wt % and their compressive strengths measured. Table 5 sets forth the components of the different hydrophobic admixtures used. The hydrophobic oil used was spent lubricant oil. The amount of oil listed is a blend that includes both the lubricant oil and SPAN 20 surfactant. The SPAN 20 to lubricant oil ratio of the blend is in a weight ratio of 3:7.

TABLE 5

| (1) Control mortar without additive Compressive Strength (MPa) | | |
|---|---|---|
| 7 days | 14 days | 28 days |
| 26.786 | 35.829 | 39.019 |

| (2) MRP replacement levels for silica sand were 4.5 wt % | | | | | |
|---|---|---|---|---|---|
| Composition of Admixture (wt%) | | | Compressive Strength (MPa) | | |
| R | O | AC | 7 days | 14 days | 28 days |
| 100 | 0 | 0 | 11.806 | 13.551 | 15.412 |
| 80 | 0 | 20 | 26.057 | 28.014 | 33.903 |
| 60 | 0 | 40 | 27.301 | 33.531 | 36.917 |
| 50 | 0 | 50 | 29.948 | 37.523 | 42.245 |
| 40 | 0 | 60[*5] | 29.953 | 35.566 | 43.66 |
| 72.7 | 7.3 | 20 | 13.027 | 16.16 | 18.181 |
| 52.2 | 7.8 | 40[*7] | 22.425 | 27.931 | 31.066 |
| 41.7 | 8.3 | 50[*8] | 27.233 | 32.457 | 34.022 |
| 35 | 5 | 60[*6] | 30.754 | 38.384 | 42.068 |
| 32 | 8 | 60[*9] | 31.001 | 36.921 | 42.321 |
| 30 | 10 | 60[*10] | 29.192 | 34.771 | 39.081 |
| 66.7 | 13.3 | 20 | 11.208 | 14.031 | 15.237 |
| 46.2 | 13.8 | 40 | 16.622 | 19.49 | 22.183 |
| 35.7 | 14.3 | 50 | 21.152 | 26.16 | 29.673 |
| 25.0 | 15.0 | 60[*11] | 26.929 | 31.352 | 33.096 |

TABLE 5-continued

| | | | | | |
|---|---|---|---|---|---|
| 15.0 | 15.0 | 70[*12] | 28.975 | 35.221 | 39.504 |
| 5.0 | 15.0 | 80[*13] | 31.066 | 37.18 | 43.419 |

Note:
R - Crumb rubber particles
O - Spent lubricant oil
AC—Activated carbon
* designates mortar specimens subject to hydrophobicity assessment in Example 3. The number associated with each (*) refers to the figure number in the drawings.

The data demonstrate that the mortar specimen containing the untreated crumb rubber had a lower compressive strength than the control specimen. The results further show that incorporating hydrophobic admixtures that contained a large percentage of oil can significantly weaken the compressive strengths of the mortar specimens. However, employing hydrophobic admixtures that have above 50% activated carbon improved the compressive strengths of the mortar specimens.

EXAMPLE 3

The behavior of water droplets deposited on the surface of the mortar specimen is an indicator of the effectiveness of the hydrophobic admixtures. Water droplets were placed on the surfaces of some of the mortar specimens that exhibited good compressive strengths as described in Example 2. In particular, water droplets were applied to the mortar specimens designated by (*) in Table 5 and photographs of the specimens taken about 30 seconds after the water droplets were deposited.

Figure 5A:
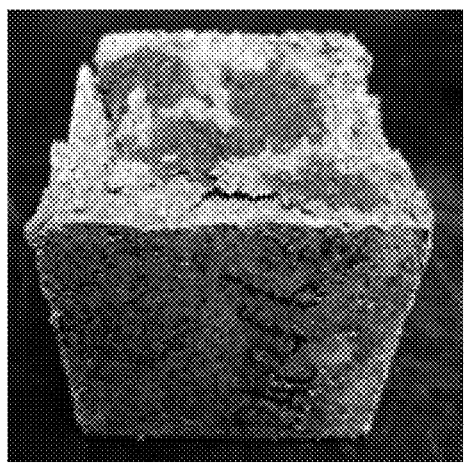
FIGS. 5A and 5B are photographic views of mortar specimens incorporating a hydrophobic admixture of (i) rubber mixture containing 40 wt % crumb rubber particles, no lubricant oil, and 60 wt % activated carbon and (ii) no SPAN 20 surfactants.
Figure 5B:
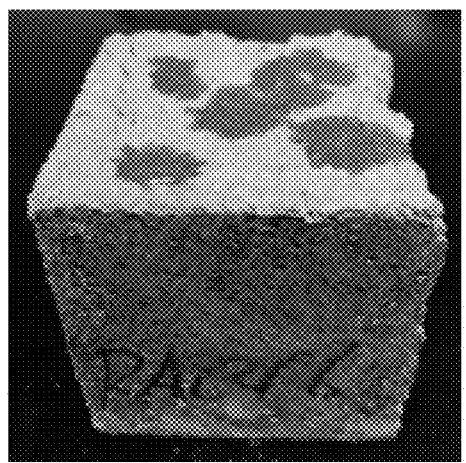
Figure 6:
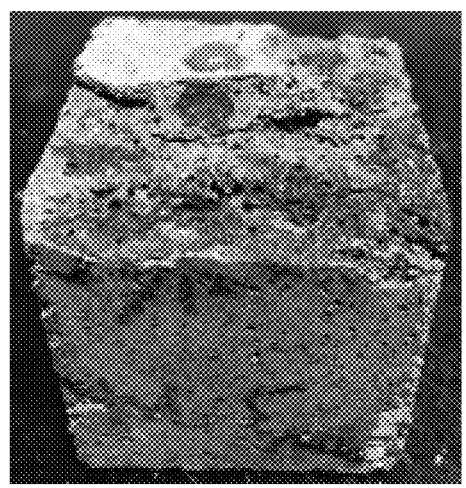
FIG. 6 is a photographic view of a mortar specimen incorporating a hydrophobic admixture of 35 wt % crumb rubber particles, 5 wt % lubricant oil and SPAN 20 blend, and 60 wt % activated carbon, wherein the surfactant to lubricant oil weight ratio is 3:7.
Figure 7A:
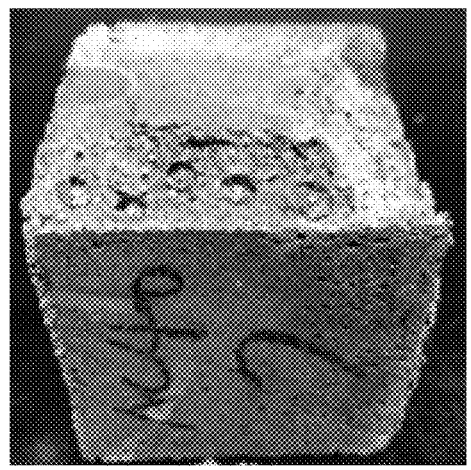
FIGS. 7A and 7B are photographic views of mortar specimens incorporating a hydrophobic admixture of 52.2 wt % crumb rubber particles, 7.8 wt % lubricant oil and SPAN 20 blend, and 40 wt % activated carbon and (ii) surfactant, wherein the surfactant to lubricant oil weight ratio is 3:7.
Figure 7B:
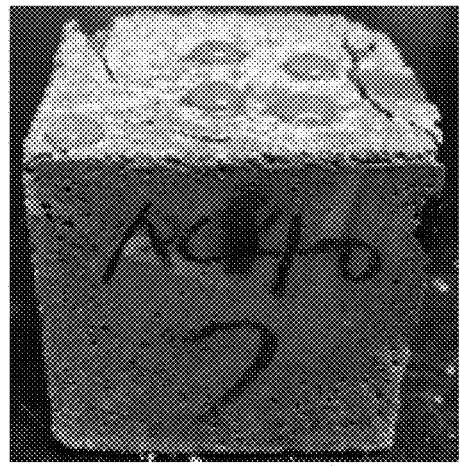
Figure 8A:
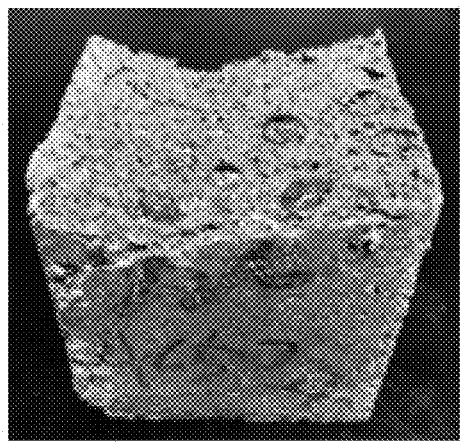
FIGS. 8A and 8B are photographic views of mortar specimens incorporating a hydrophobic admixture of 41.7 wt % crumb rubber particles, 8.3 wt % lubricant oil and SPAN 20 blend, and 50 wt % activated carbon, wherein the surfactant to lubricant oil weight ratio is 3:7.
Figure 8B:
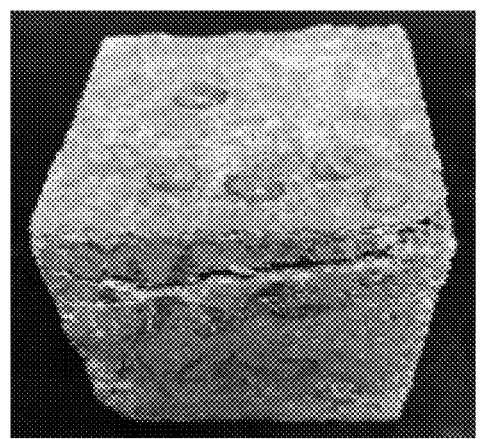
Figure 9A:
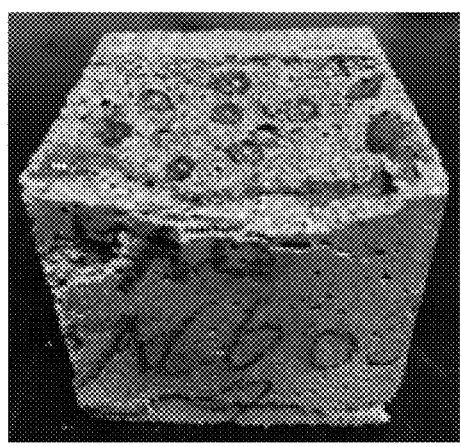
FIGS. 9A and 9B are photographic views of mortar specimens incorporating a hydrophobic admixture of 32 wt % crumb rubber particles, 8 wt % lubricant oil and SPAN 20 blend, and 60 wt % activated carbon, wherein the surfactant to lubricant oil weight ratio is 3:7.
Figure 9B:
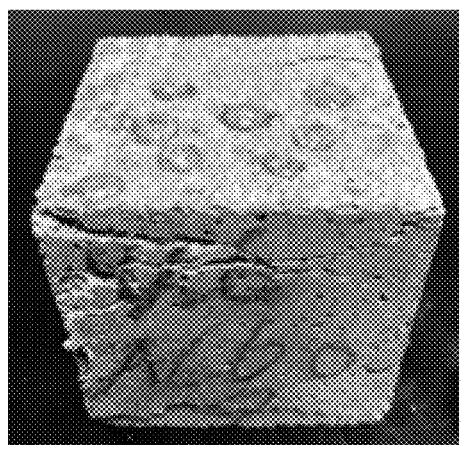

FIGS. 5A and 5B are views of the mortar specimen wherein the hydrophobic admixture comprised 40 wt % crumb rubber particles, no lubricant oil, and 60 wt % activated carbon and no SPAN 20 surfactant. The water completely wets the surface and suggests that this admixture combination conferred no water repellency. As shown in FIG. 6, the mortar specimen with 35 wt % crumb rubber, 5 wt % oil, and 60 wt % activated carbon exhibited no significant improvement in the water repellency. However, improved water repellency is evident in mortar specimens where the hydrophobic admixture had more than 7 wt % oil as shown in the photographs of FIGS. 7 through 13.

EXAMPLE 4

In this example, hydrophobic admixture containing various oil (hydrophobic agent) sources including spent lubricant oil, used motor oil, castor oil, caprylic/capric triglyceride, silicone oil 350, silicone oil 1000, base oil 150N, base oil 500N, and n-butyl stearate were tested. Test mortar specimens were prepared where the hydrophobic admixture replacement levels for silica sand were 4.5 wt %. The amount of oil listed is a blend that includes both the lubricant oil and SPAN 20 surfactant. The SPAN 20 to lubricant oil ratio of the blend is in a weight ratio of 3:7. Table 6 summarizes the effect of different oils on the compressive strengths of mortar specimens.

TABLE 6

| (1) Control mortar without additive Compressive Strength (MPa) | | |
|---|---|---|
| 7 days | 14 days | 28 days |
| 26.786 | 35.829 | 39.019 |

| (2) Mortar with Admixture containing 5 wt % various oils | | | | | | |
|---|---|---|---|---|---|---|
| | Composition of Admixture (wt %) | | | Compressive Strength (MPa) | | |
| Oil source | R | O | AC | 7 days | 14 days | 28 days |
| Spent lubricant oil | 35 | 5 | 60 | 30.754 | 33.384 | 42.068 |
| Used motor oil | 35 | 5 | 60 | 31.188 | 37.8 | 43.339 |
| Castor oil | 35 | 5 | 60 | 25.976 | 31.145 | 37.58 |
| Caprylic/capric triglyceride | 35 | 5 | 60 | 23.798 | 28.15 | 33.605 |

| (3) Mortar with Admixture containing 10 wt % various oils | | | | | | |
|---|---|---|---|---|---|---|
| | Composition of Admixture (wt %) | | | Compressive Strength (MPa) | | |
| Oil source | R | O | AC | 7 days | 14 days | 28 days |
| Spent lubricant oil | 30 | 10 | 60 | 29.192 | 34.771 | 39.081 |
| Used motor oil | 30 | 10 | 60 | 30.887 | 36.568 | 41.972 |
| Castor oil | 30 | 10 | 60 | 22.819 | 26.901 | 31.274 |
| Caprylic/capric triglyceride | 30 | 10 | 60 | 16.719 | 17.208 | 21.367 |
| Silicone oil 350 | 30 | 10 | 60 | 19.298 | 21.42 | 24.331 |
| Silicone oil 1000 | 30 | 10 | 60 | 18.501 | 22.694 | 25.598 |
| Base oil 150N | 30 | 10 | 60 | 28.254 | 36.116 | 44.424 |
| Base oil 500N | 30 | 10 | 60 | 29.491 | 36.181 | 41.673 |
| n-butyl stearate | 30 | 10 | 60 | 27.336 | 28.549 | 39.593 |

Note:
R—Crumb rubber particles
O—Oil
AC—Activated carbon

The data demonstrate that the mortar specimens containing castor oil, triglyceride, or silicone oil had lower compressive strengths than the control mortar specimen with no additive. Mortar specimens where the hydrophobic admixture contained petroleum-based oils, including spent lubricant oil, used motor oil, base oil 150N, or base oil 500N, had significantly higher compressive strengths than those with untreated crumb rubber particles as the sole additive or those with no additives.

Water droplets were placed on the surfaces of mortar specimens and photographs of the specimens taken about 30 seconds after the water droplets were deposited. The series of images in FIGS. 14A to 14D show the surface and interiors of the mortar specimens with 35 wt % rubber, 60 wt % activated carbon, and 5 wt % oil consisting of spent lubricant oil, used motor oil, castor oil, and caprylic/capric triglyceride, respectively.

The series of images in FIGS. 15A to 15I show the surface and interiors of the mortar specimens with 30 wt % rubber, 60 wt % activated carbon, and 10 wt % oil consisting of spent lubricant oil, used motor oil, castor oil, caprylic/capric triglyceride, silicone oil 350, silicone oil 1000, base oil 150, base oil 500, and n-butyl stearate, respectively.

It is evident that hydrophobic admixtures containing 10 wt % oil improved the water-repelling properties of both surface and inside of mortar specimens than that of 5 wt % oil. The contact angle for the inner surface was large which confirmed that the hydrophobicity in the interior of the sample was good. It also demonstrates that the hydrophobic admixture was uniformly dispersed in the cement paste and not just on the surface.

EXAMPLE 5

In this example, hydrophobic admixtures were formed by mixing crumb rubber particles, spent lubricant oil, activated carbon, and silica fume or spent RFCC catalyst. Test mortar specimens were prepared where the hydrophobic admixture replacement levels for silica sand were 4.5 wt %. The amount of oil listed is a blend that includes both the lubricant oil and SPAN 20 surfactant. The SPAN 20 to lubricant oil ratio of the blend is in a weight ratio of 3:7. Table 7 summarizes the compressive test results.

TABLE 7

| Composition of Admixture (wt %) | | | | Compressive Strength (MPa) | | |
|---|---|---|---|---|---|---|
| R | O | AC | SF | 7 days | 14 days | 28 days |
| 30 | 10 | 60 | 0 | 29.192 | 34.771 | 39.081 |
| 30 | 10 | 40 | 20 | 21.978 | 23.593 | 29.612 |
| 30 | 10 | 20 | 40 | 22.445 | 27.082 | 32.041 |

| Composition of Admixture (wt %) | | | | Compressive Strength (MPa) | | |
|---|---|---|---|---|---|---|
| R | O | AC | RFCC | 7 days | 14 days | 28 days |
| 30 | 10 | 60 | 0 | 29.192 | 34.771 | 39.081 |
| 30 | 10 | 40 | 20 | 23.962 | 31.581 | 35.743 |
| 30 | 10 | 20 | 40 | 15.769 | 19.505 | 21.231 |

Figure 10:
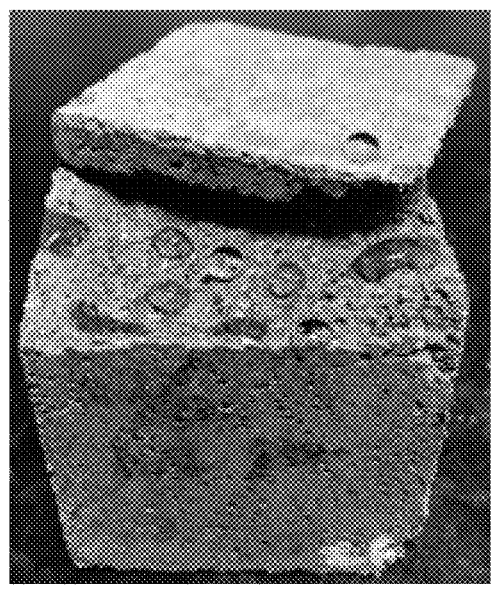
FIG. 10 is a photographic view of a mortar specimen incorporating a hydrophobic admixture of 30 wt % crumb rubber particles, 10 wt % lubricant oil and SPAN 20 blend, and 60 wt % activated carbon, wherein the surfactant to lubricant oil weight ratio is 3:7.
Figure 11A:
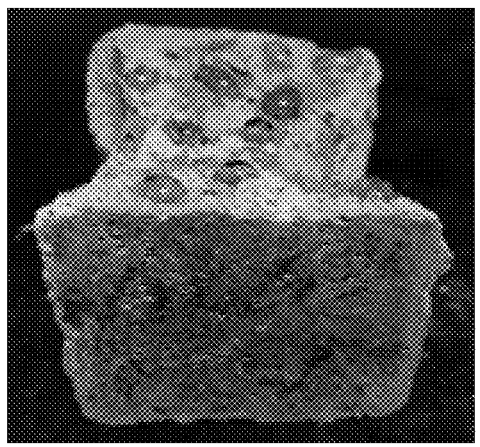
FIGS. 11A and 11B are photographic views of mortar specimens incorporating a hydrophobic admixture of 25 wt % crumb rubber particles, 15 wt % lubricant oil and SPAN 20 blend, and 60 wt % activated carbon, wherein the surfactant to lubricant oil weight ratio is 3:7.
Figure 11B:
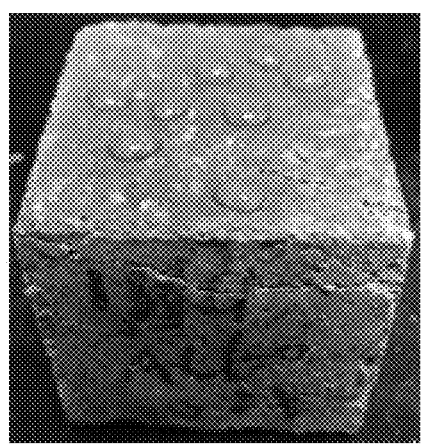

Note:
R—Crumb rubber particles
O—Spent lubricant oil
AC—Activated carbon
SF—Silica fume
RFCC—Spent residual oil fluid catalytic cracking catalyst The addition of silica fume or RFCC reduced the compressive strengths of the mortar specimens. FIGS. 16 and 17 are photographs of the surface and interior of the specimens made with hydrophobic admixtures containing 30 wt % rubber particles, 10 wt % oil, 40 wt % activated carbon, and 20 wt % silica fume or RFCC, respectively. The water repellencies of these mortar specimens appear to be comparable to that of the mortar specimen made of the hydrophobic admixture with 30 wt % rubber particles, 10 wt % oil, and 60 wt % activated carbon, as shown in FIG. 10.

EXAMPLE 6

The microstructures of the hydrated cement pastes made with selected hydrophobic admixtures were examined with a scanning electron microscope. The cement powder and admixtures were mixed in a weight ratio of 10:1. The water to cement weight ratio was 0.45. The cement paste samples were poured into petri dishes and allowed to cured for 28 days at ambient temperature of about 20° C. Water droplets were deposited onto the cured cement paste samples. Table 8 sets forth the admixture components of 4 samples tested. The oil component includes SPAN 20 surfactant, wherein the surfactant to oil weight ratio is 3:7

TABLE 8

| Composition of Admixture (wt %) | | | |
|---|---|---|---|
| R | O | AC | SF |
| 30 | 10 (SL) | 60 | 0 |
| 30 | 10 (BO) | 60 | 0 |
| 30 | 10 (BS) | 60 | 0 |
| 30 | 10 (BS) | 40 | 20 |

Figure 18A:
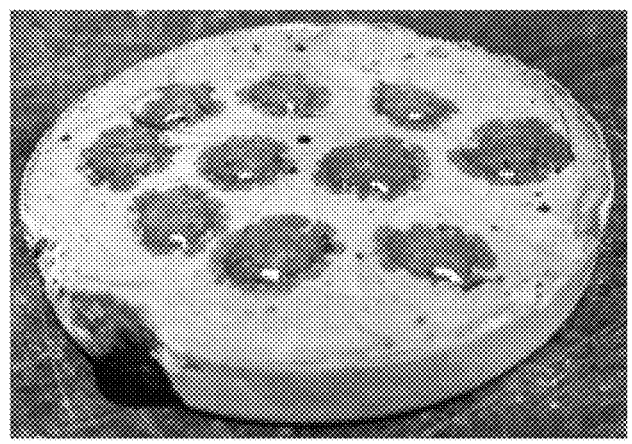
FIG. 18A is a photographic view of a cement paste specimen incorporating a hydrophobic admixture of 30 wt % crumb rubber particles, 10 wt % spent lubricant oil and SPAN 20 blend, and 60 wt % activated carbon, wherein the surfactant to spent lubricant oil weight ratio is 3:7
Figure 18B:
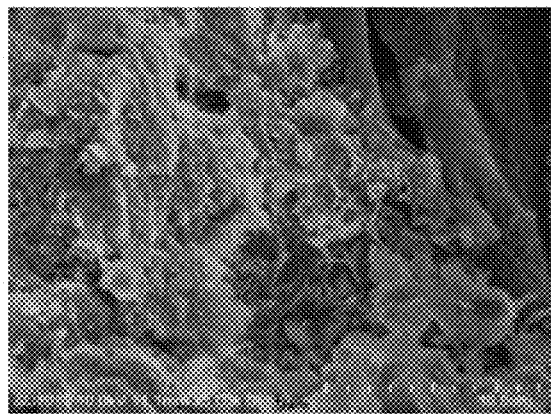
FIGS. 18B and 18C are SEM images of the specimen.
Figure 18C:
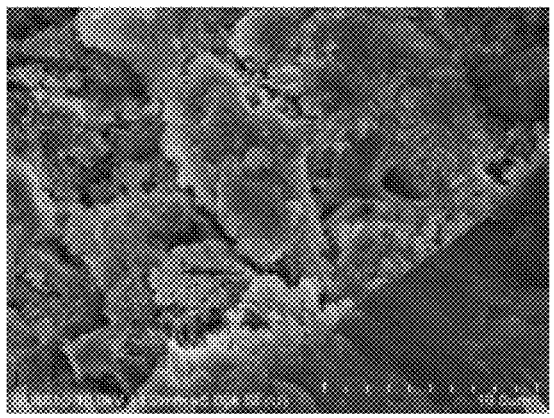

Note:
R - Crumb rubber particles
O - (SL) is spent lubricant oil; (BO) is base oil 500; (BS) is n-butyl stearate
AC—Activated carbon
SF—Silica fume FIG. 18A is a photograph of the first specimen and FIGS. 18B and 18C are SEM images of the specimen.

Figure 19A:
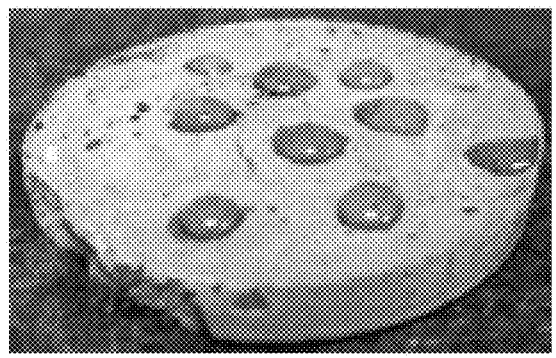
FIG. 19A is a photographic view of a cement paste specimen incorporating a hydrophobic admixture of 30 wt % crumb rubber particles, 10 wt % base oil 500 and SPAN 20 blend, and 60 wt % activated carbon, wherein the surfactant to base oil weight ratio is 3:7
Figure 19B:
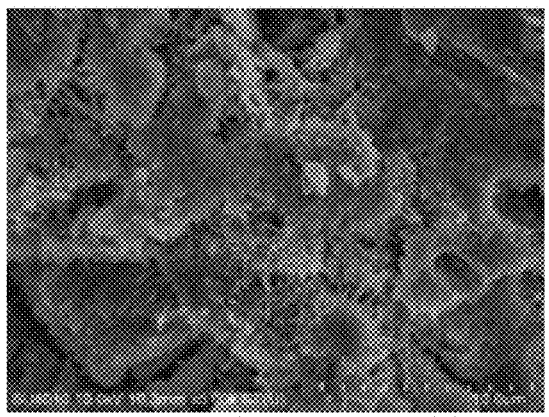
FIGS. 19B, 19C and 19D are SEM images of the specimen.
Figure 19C:
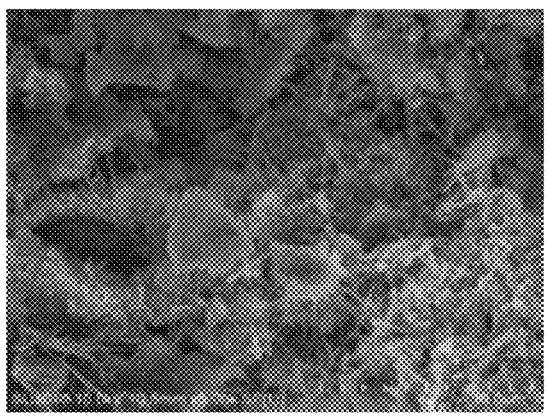
Figure 19D:

FIG. 19A is a photograph of the second specimen and FIGS. 19B, 19C and 19D are SEM images of the specimen.

Figure 20A:
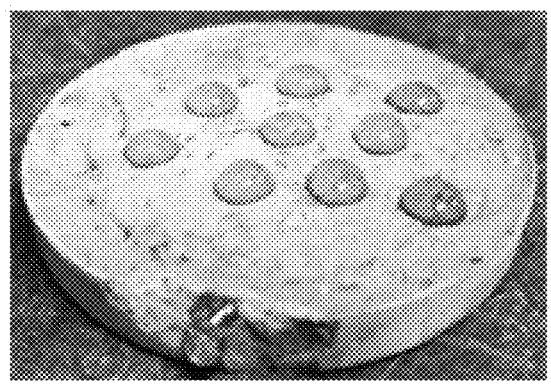
FIG. 20A is a photographic view of a cement paste specimen of a hydrophobic admixture of 30 wt % crumb rubber particles, 10 wt % n-butyl stearate and SPAN 20 blend, and 60 wt % activated carbon, wherein the surfactant to n-butyl stearate weight ratio is 3:7
Figure 20B:
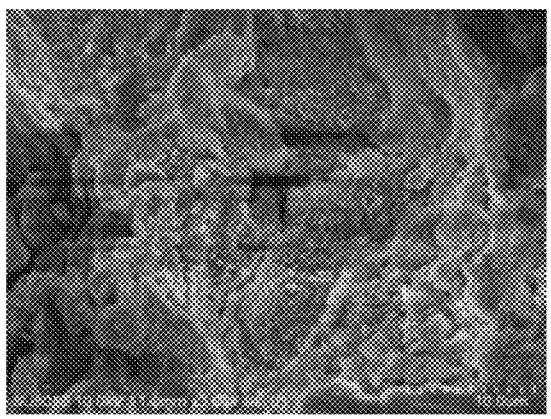
FIGS. 20B and 20C are SEM images of the specimen.
Figure 20C:
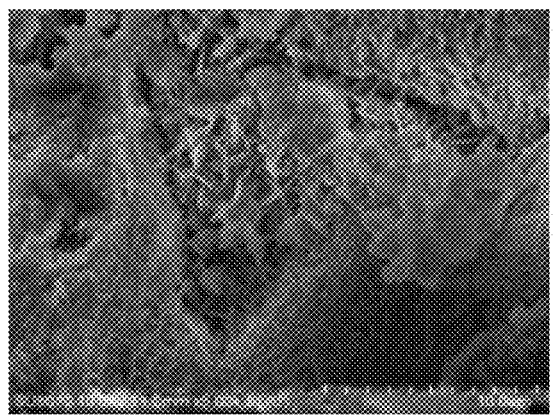

FIG. 20A is a photograph of the third specimen and FIGS. 20B and 20C are SEM images of the specimen.

Figure 21A:
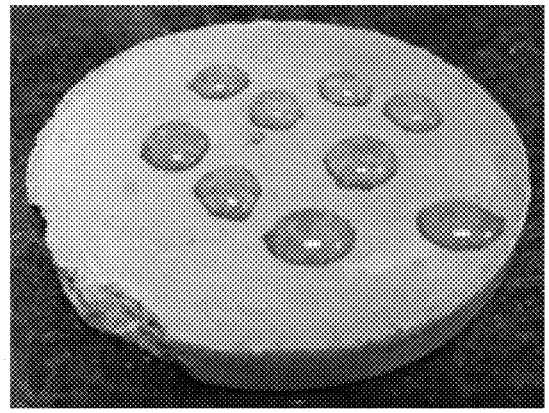
FIG. 21A is a photographic view of a cement paste specimen incorporating a hydrophobic admixture of 30 wt % crumb rubber particles, 10 wt % n-butyl stearate and SPAN 20 blend, 40 wt % activated carbon, and 20 wt % silica fume, wherein the surfactant to n-butyl stearate weight ratio is 3:7
Figure 21B:
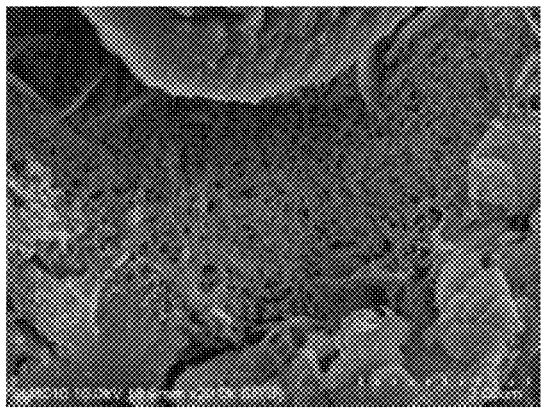
FIGS. 21B, 21C and 21D are SEM images of the specimen.
Figure 21C:
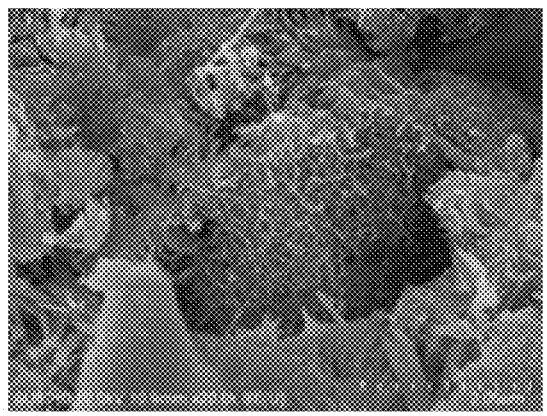
Figure 21D:
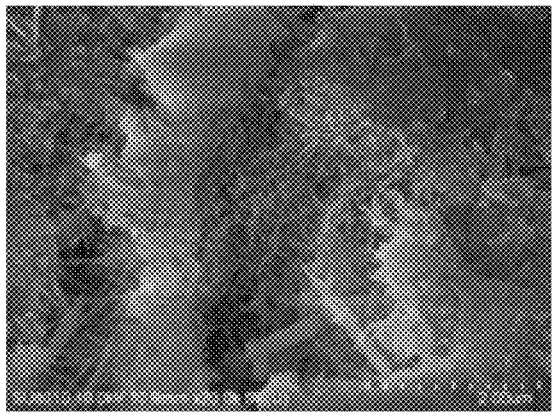

FIG. 21A is a photograph of the fourth specimen and FIGS. 21B, 21C and 21D are SEM images of the specimen.

The photographs show that each of the cement paste specimens exhibited good hydrophobic properties. The SEM images show a very tight and uniform microstructure and that the hydrophobic carrier and agent are well dispersed in the cement matrix. The SEM images show that more amorphous calcium-silicate-hydrate (C-S-H) gel is formed, which indicates that the addition of hydrophobic admixture of into cement paste did not adversely affect the cement hydration. The formation of different morphologies of C-S-H gel is due to the different phase compositions of the gel.

What is claimed is:

1. An admixture composition, for improving the hydrophobicity of a cementitious material that comprises a cement mixture with hydrated cement particles dispersed therein, which comprises solid polymer particles that have a surface coating comprising a blend of a surfactant and a hydrophobic agent which is selected from the group consisting of waste lubricant oil, spent motor oil, base oil, ester of fatty acids, vegetable oil, and mixtures thereof, wherein the solid polymer particles adhere to exterior surfaces of the hydrated cement particles, and fine particles that are selected from the group consisting of activated carbon, silica fume, spent catalyst, and mixtures thereof.

2. An admixture composition, for improving the hydrophobicity of a cementitious material that comprises a cement mixture with hydrated cement particles dispersed therein, which comprises solid polymer particles that have a surface coating comprising a hydrophobic agent, wherein the solid polymer particles adhere to exterior surfaces of the hydrated cement particles, and fine particles that are selected from the group consisting of activated carbon, silica fume, spent catalyst, and mixtures thereof.

3. The admixture composition of claims 1 or 2 comprising fine particles that have diameters that range from 1 to 1000 µm.

4. The admixture composition of claim 3 wherein the weight ratio of solid polymer particles to fine particles ranges from 10:1 to 1:10.

5. The admixture composition of claim 4 wherein the weight ratio of solid polymer particles to fine particles ranges from 2:1 to 1:2.

6. The admixture composition of claims 1 or 2 comprising fine particles and wherein the weight ratio of (i) the combination of solid polymer particles and the fine particles to (ii) the hydrophobic agent ranges from 10:1 to 10:3.

7. The admixture composition of claims 1 or 2 wherein the surface coating comprises a blend of nonionic surfactant and the hydrophobic agent which is selected from the group consisting of waste lubricant oil, spent motor oil, base oil, ester of fatty acids, vegetable oil, and mixtures thereof.

8. The admixture composition of claim 7 comprising 10 to 40% by weight solid polymer particles, 20 to 80% by weight fine particles, 1 to 10% by weight of the blend, wherein the weight ratio of nonionic surfactant to hydrophobic agent in the blend is 0.1 to 0.5.

9. The admixture composition of claim 8 wherein the solid polymer particles comprise crumb rubber particles and the fine particles comprise activated carbon.

10. The admixture composition of claim 1 wherein the solid particles comprise crumb rubber particles.

11. The admixture composition of claim 10 wherein the crumb rubber particles are made from waste rubber tires, recycled plastics, and mixtures thereof.

12. The admixture composition of claim 1 wherein the solid polymer particles have diameters that range from 100 to 1000 µm.

13. The admixture composition of claim 1 comprising 10 to 40% by weight carrier particles and 1 to 10% by weight hydrophobic agent.

14. The admixture composition of claim 1 comprising 10 to 40% by weight carrier particles, 1 to 10% by weight of the blend wherein the weight ratio of surfactant to hydrophobic agent in the blend is 0.1 to 0.5.

15. The admixture composition of claim 1 wherein the surfactant has an HLB value of 1.0-15.0.

16. The admixture composition of claim 15 wherein the surfactant has an HLB value of 5.0-10.0.

17. The admixture composition of claim 1 wherein the surfactant comprises a nonionic surfactant.

18. The admixture composition of claim 1 wherein the solid polymer particles comprise crumb rubber particles and the fine particles comprise activated carbon.

19. The admixture composition of claim 2 wherein the solid particles comprise crumb rubber particles.

20. The admixture composition of claim 19 wherein the crumb rubber particles are made from waste rubber tires, recycled plastics, and mixtures thereof.

21. The admixture composition of claim 2 wherein the solid polymer particles have diameters that range from 100 to 1000 µm.

22. The admixture composition of claim 2 comprising 10 to 40% by weight carrier particles and 1 to 10% by weight hydrophobic agent.

23. The admixture composition of claim 2 wherein the surface coating comprises a blend of surfactant and the hydrophobic agent which is selected from the group consisting of waste lubricant oil, spent motor oil, base oil, ester of fatty acids, vegetable oil, and mixtures thereof.

24. The admixture composition of claim 23 wherein the surfactant has an HLB value of 1.0-15.0.

25. The admixture composition of claim 24 wherein the surfactant has an HLB value of 5.0-10.0.

26. The admixture composition of claim 23 wherein the surfactant is a nonionic surfactant.

27. The admixture composition of claim 23 wherein the solid polymer particles comprise crumb rubber particles and the fine particles comprise activated carbon.

* * * * *